United States Patent
Binétruy et al.

(10) Patent No.: US 9,852,517 B2
(45) Date of Patent: Dec. 26, 2017

(54) METHOD FOR ESTIMATING THE VOLUME OF A REMAINING FLUIDUM IN A NON-TRANSLUCENT RECIPIENT USING AN IMAGE OF THE RECIPIENT

(71) Applicant: OCÉ-TECHNOLOGIES B.V., Venlo (NL)

(72) Inventors: Stephane Binétruy, Vaux le Penil (FR); Bruno Bianchi, Moissy-Cramayel (FR); Stephen Wendell, Arcueil (FR)

(73) Assignee: OCÉ-TECHNOLOGIES B.V., Venlo (NL)

(*) Notice: Subject to any disclaimer, the term of this patent is extended or adjusted under 35 U.S.C. 154(b) by 17 days.

(21) Appl. No.: 15/148,073

(22) Filed: May 6, 2016

(65) Prior Publication Data

US 2016/0247294 A1 Aug. 25, 2016

Related U.S. Application Data

(63) Continuation of application No. 14/244,660, filed on Apr. 3, 2014, now Pat. No. 9,383,192.

(30) Foreign Application Priority Data

Apr. 4, 2013 (EP) .................................. 13305438

(51) Int. Cl.
*G06T 7/60* (2017.01)
*G01B 11/02* (2006.01)
(Continued)

(52) U.S. Cl.
CPC ............. *G06T 7/602* (2013.01); *B65H 18/28* (2013.01); *B65H 26/06* (2013.01); *G01B 11/02* (2013.01);
(Continued)

(58) Field of Classification Search
CPC .... G06T 7/602; H04N 5/23293; H04N 7/185; H04N 1/00068; G01B 11/02; B65H 18/28; B65H 2511/114; B65H 2511/142
See application file for complete search history.

(56) References Cited

U.S. PATENT DOCUMENTS 4,021,002 A * 5/1977 Meihofer ............... B65H 26/06
242/554
4,500,203 A 2/1985 Bieringer
(Continued)

FOREIGN PATENT DOCUMENTS

| EP | 2015035 A1 * | 1/2009 | ......... G01F 23/2928 |
| EP | 2 425 984 A1 | 3/2012 | |
| WO | WO 2012/000560 A1 | 1/2012 | |

OTHER PUBLICATIONS

W.B. Gilbert, "Methods of Diameter Determination for Center Driven Unwinds & Rewinds—Advantages and Disadvantages", Siemens, pp. 1-11, Oct. 2, 2009.

*Primary Examiner* — Jay Patel
*Assistant Examiner* — Joseph Suh
(74) *Attorney, Agent, or Firm* — Birch, Stewart, Kolasch & Birch, LLP (57) ABSTRACT

A method of estimating a volume of a remaining fluidum in a non-translucent recipient having an opening which area is wider than or equal to the area of a bottom of the recipient. The method includes taking a picture of the opening at the top side of the recipient by with camera, deriving from the picture characteristics of a first and second number of pixels representing a visible part of the recipient and a visible part of the fluidum in the recipient, respectively, requesting from a user an identification of the recipient, matching the identification with a stored identification in order to retrieve reference data about an empty recipient, and estimating a volume of the remaining fluidum in the recipient by means (Continued)

of the retrieved reference data and a ratio of the characteristics of the first number of pixels and the characteristics of the second number of pixels.

13 Claims, 9 Drawing Sheets

(51) Int. Cl.
  *G06T 7/00*      (2017.01)
  *H04N 1/00*      (2006.01)
  *H04N 7/18*      (2006.01)
  *B65H 26/06*     (2006.01)
  *B65H 18/28*     (2006.01)
  *H04N 5/232*     (2006.01)
  *G06T 7/62*      (2017.01)

(52) U.S. Cl.
  CPC ............ *G01B 11/022* (2013.01); *G06T 7/001* (2013.01); *G06T 7/62* (2017.01); *H04N 1/00068* (2013.01); *H04N 5/23293* (2013.01); *H04N 7/18* (2013.01); *H04N 7/185* (2013.01); *B65H 2511/114* (2013.01); *B65H 2511/142* (2013.01); *B65H 2553/42* (2013.01); *G06T 2207/30124* (2013.01)

(56) References Cited

U.S. PATENT DOCUMENTS

| | | | |
|---|---|---|---|
| 5,769,353 A | 6/1998 | Juhe et al. | |
| 5,973,770 A * | 10/1999 | Carter | G01F 23/292 356/4.09 |
| 6,237,234 B1 * | 5/2001 | Jackson | G01B 11/08 33/203 |
| 6,448,549 B1 * | 9/2002 | Safaee-Rad | G01N 21/9054 250/223 B |
| 6,463,426 B1 * | 10/2002 | Lipson | G06F 17/30247 |
| 7,245,839 B2 * | 7/2007 | Nakashima | G03G 15/553 399/24 |
| 7,464,594 B2 * | 12/2008 | Cato | B41J 11/0075 73/584 |
| 7,584,338 B1 * | 9/2009 | Bricker | G06F 17/30212 707/999.202 |
| 2001/0011279 A1 * | 8/2001 | Hajjar | G06K 15/00 |
| 2002/0029127 A1 * | 3/2002 | Wakashiro | G01C 11/06 702/152 |
| 2002/0138355 A1 * | 9/2002 | Briggs | G06Q 10/087 705/26.1 |
| 2002/0169645 A1 * | 11/2002 | Aronstam | G06Q 10/06 702/188 |
| 2003/0055696 A1 * | 3/2003 | Tsukishima | G06Q 10/06 705/7.28 |
| 2003/0223550 A1 * | 12/2003 | Kim | G01N 23/04 378/207 |
| 2004/0053696 A1 * | 3/2004 | Kim | A63F 9/24 463/42 |
| 2004/0249689 A1 * | 12/2004 | Naraki | G06Q 10/06 705/7.22 |
| 2005/0145745 A1 * | 7/2005 | Lewis | A47K 5/06 242/563 |
| 2005/0156078 A1 * | 7/2005 | Ragard | B65H 18/16 242/534 |
| 2005/0284934 A1 * | 12/2005 | Ernesti | G06Q 20/203 235/385 |
| 2006/0140473 A1 * | 6/2006 | Brooksby | G01N 21/9515 382/154 |
| 2006/0178578 A1 * | 8/2006 | Tribble | B65B 3/003 600/432 |
| 2007/0107801 A1 * | 5/2007 | Cochran | B65B 3/36 141/153 |
| 2007/0135961 A1 * | 6/2007 | Ishida | B65G 1/0435 700/213 |
| 2007/0152060 A1 * | 7/2007 | Kiliccote | G06K 7/1443 235/462.09 |
| 2007/0264039 A1 * | 11/2007 | Saito | G06F 3/1204 399/81 |
| 2008/0094211 A1 * | 4/2008 | Teller | G06Q 20/203 340/540 |
| 2008/0142631 A1 * | 6/2008 | Vorhees | B65H 26/08 242/534.2 |
| 2008/0169044 A1 * | 7/2008 | Osborne | A61J 1/2096 141/1 |
| 2008/0219685 A1 * | 9/2008 | Muratani | B41J 11/003 399/45 |
| 2008/0262650 A1 * | 10/2008 | Dorendorf | A01M 7/0089 700/240 |
| 2008/0320304 A1 * | 12/2008 | Fontijn | G01C 21/26 713/165 |
| 2009/0062295 A1 * | 3/2009 | Ozaki | A61K 9/0019 514/252.03 |
| 2009/0140001 A1 * | 6/2009 | Lewis | A47K 10/3625 221/13 |
| 2009/0198208 A1 * | 8/2009 | Stavsky | A61J 1/2096 604/407 |
| 2009/0261981 A1 * | 10/2009 | Jones | G06Q 10/06 340/666 |
| 2009/0283565 A1 * | 11/2009 | Ibanez | B65H 26/06 226/10 |
| 2010/0154377 A1 * | 6/2010 | Oh | D02G 3/48 57/258 |
| 2010/0155415 A1 * | 6/2010 | Ashrafzadeh | B67D 1/001 222/1 |
| 2010/0332653 A1 * | 12/2010 | Mizuno | G06F 3/1203 709/224 |
| 2011/0150347 A1 * | 6/2011 | Wang | G06T 7/001 382/218 |
| 2011/0292150 A1 * | 12/2011 | Ishii | B41J 3/4075 347/110 |
| 2012/0137307 A1 * | 5/2012 | Sarferaz | G06Q 10/10 719/317 |
| 2012/0141326 A1 * | 6/2012 | Kuwano | G01N 35/00732 422/67 |
| 2012/0301009 A1 * | 11/2012 | Dabic | G07D 5/005 382/136 |
| 2015/0006430 A1 * | 1/2015 | Ben-Alexander | G06Q 10/109 705/337 |
| 2015/0265753 A1 * | 9/2015 | Prentice | A61M 1/0031 604/74 |

* cited by examiner

METHOD FOR ESTIMATING THE VOLUME OF A REMAINING FLUIDUM IN A NON-TRANSLUCENT RECIPIENT USING AN IMAGE OF THE RECIPIENT

CROSS-REFERENCE TO RELATED APPLICATIONS

This application is a Continuation of copending U.S. application Ser. No. 14/244,660, filed on Apr. 3, 2014, which claims priority under 35 U.S.C. §119(a) to application Ser. No. 13/305,438.7, filed in Europe on Apr. 4, 2013, all of which are hereby expressly incorporated by reference into the present application.

BACKGROUND OF THE INVENTION

1. Field of the Invention

The present invention relates to a method of estimating an amount of recording material wrapped upon a core of a roll.

2. Description of Background Art

Image reproduction apparatus are nowadays equipped with sensors to estimate an amount of recording material wrapped upon a core of a roll positioned in a recording material unit of the image reproduction apparatus. However, these sensors are coupled to the image reproduction apparatus and the roll needs to be mounted in the recording material unit before the estimation can take place. The latter action results in a lower productivity of the operator.

SUMMARY OF THE INVENTION

It is an object of the present invention to provide a method for estimating the amount of recording material wrapped upon a core of a roll, which method is user-friendly and productive.

This object is achieved by a method implemented as an application program for an electronic device having a camera, the method comprising the steps of taking a picture of the recording material and the core with the camera; deriving from the picture characteristics of a first number of pixels representing the core; deriving from the picture characteristics of a second number of pixels representing the unconsumed part of the recording material; requesting from a user an identification of the roll and the type of recording material; receiving from the user the identification of the roll and the type of recording material; matching the identification with reference data about the core and the roll in an unconsumed state; and calculating the amount of the unconsumed part of the recording material by means of the matched reference data and the characteristics of the first number of pixels and the characteristics of the second number of pixels.

The characteristics of the first number of pixels are the amount of the first number of pixels and the shape of the first number of pixels, the circumference of the first number of pixels, etc. The characteristics of the second number of pixels are the amount of the second number of pixels and the shape of the second number of pixels, the circumference of the second number of pixels, etc.

Also, a relation between an area amount of the first number of pixels and an area amount of the second number of pixels may be taken into account.

According to an embodiment of the method, the reference data about the core and the roll in an unconsumed state comprises data of the dimensions of the core and data of the dimensions of the recording material in an unconsumed state. The reference data are used to compare the volume of the recording material in an unconsumed state with the amount of an unconsumed part of the recording material wrapped upon the core. The latter amount can be derived from the characteristics of the first number of pixels and the characteristics of the second number of pixels.

According to an embodiment of the method, the electronic device has a user interface screen and the method further comprises the step of displaying the calculated amount of the unconsumed recording material on the user interface screen. In this way, the user is able to immediately see the calculated amount of the unconsumed recording material. This amount can be used to estimate the remaining recording material amount to be sufficient for a specific job to be controlled by the user, for example a print job, a paint job or any other job that has the recording material as an input material for the job.

According to an embodiment, the electronic device has a camera and a storage device comprising reference data about an unused roll of the recording material and the method comprises the steps of taking a picture of an end grain of the roll with the camera; deriving from the picture a first number of pixels representing a core of the roll; deriving from the picture a second number of pixels representing the recording material of the roll; and estimating the length of the roll based on the reference data, the first number and the second number, wherein the reference data comprises at least the length of the unused roll.

According to an embodiment, the electronic device comprises a user interface screen and a camera, and is connectable to a server at which the reference data about a roll and a recording material in an unconsumed state and an application program for implementing the method according to present invention is stored, wherein said electronic device is configured to invoke the application program via the user interface screen and display the calculated amount of the unconsumed part of the recording material at the user interface screen.

By doing so, the length is estimated by taking a photograph with the camera of the electronic device and performing calculations with an application installed on the electronic device or on a server being connectable via a network with the electronic device. When a picture of the end grain of the roll is taken, the picture will show the core of the roll, the recording material on the roll and a background. The end grain of the roll is the short side of the roll. The core of the roll forms an inner part of the picture, while the recording medium forms an outer part of the picture circumventing the inner part of the picture representing the core of the roll. Usually, the core of the roll and the recording material on the roll are easily distinguishable from each other. Usually, the recording material on the roll and the background are also easily distinguishable. If the latter is not the case, a background may be selected having a deviating color than the color of the recording material. The core of the roll is delimited by a first ellipse. The recording material of the roll is delimited by a second ellipse. The eccentricity of the first ellipse and the second ellipse are the same. The pixels within the first ellipse are counted as a first number of pixels. The pixels between the first ellipse and the second ellipse are counted as a second number of pixels. By taking a quotient of the first number and the second number, a number is established which is independent of the angle and the distance from which the picture is taken. Such a quotient is beforehand established in a calibration phase as a reference quotient for an unused roll of the same kind and width and stored as part of the reference data. The reference data also contains the length of an unused roll of the same kind. Such a reference quotient is then used in a calculation with the quotient of the roll under investigation and the length of the unused roll. In this way, the remaining length is easily calculated for the roll under investigation.

A calibration phase may be envisioned for delivering the reference data to be stored at the electronic device or at the server. Calibration may take place for a plurality of types of rolls of recording material. The reference data will comprise identification data for each kind of roll. The identification data are requested to be entered and added to the reference data during the calibration phase. The roll from which the first picture is taken has to be identified by entering identification data before the calculation of the remaining roll is performed. The entered identification data will be compared with the identification data already present in the reference data.

The electronic device may a mobile phone, a smart phone, a tablet personal computer, a notebook computer, a laptop computer or the like. Nowadays, electronic devices may be provided with a built-in camera for taking pictures by the user. Pictures taken may be shown at a user interface screen of the electronic device, may be stored in memory of the electronic device or in memory of the server, or may be processed by applications installed at the electronic device or installed at the server. The user interface screen may be touchable by a finger, a pen or a stylus or clickable by a mouse. A touch screen may be sensitive for a single touch gesture or a multi-touch gesture. An application program—shortly named app—may be stored at the storage of the electronic device or at the server. The application program may include the reference data or the reference data may be stored separately and linked to the application program afterwards.

According to a further embodiment, the method comprises the additional step of determining the width of the roll and wherein the reference data comprises the diameter of the core of the roll. The picture of the end grain of the roll is taken from a position outside a virtual roll being an extension of the real roll in a direction of the width of the roll, the method comprises the further steps of deriving from the picture a third number of pixels representing the width of the roll and estimating the width of the roll based on the reference data, the first number, the second number and the third number, wherein the picture of the end grain of the unused roll has been taken at a predetermined angle between a line from the camera to the closest outer bound position of the media of the unused roll and the normal vector of the plane of the end grain of the unused roll and the reference data comprises the diameter of the core of the roll. Since a number of pixels is visible and the reference data comprises the diameter of the core of the roll and not the width of the unused roll, it is still possible to derive the actual width of the roll from the reference data, the first number of pixels, the second number of pixels and the third number of pixels established here-above. The picture of the end grain of the unused roll has been taken at the predetermined angle. This picture also shows some pixels representing the width of the roll. Pixels in the direction of the width of the unused roll are counted as a third number. It is possible to estimate the width of the used roll, which is equal to the width of the unused roll, based on the first number, the second number and the third number, and the diameter of the core of the roll. The predetermined angle may be equal to 30, 45 or 60 degrees since it simplifies the calculations to be performed for the estimation, but any other predetermined angle, e.g. between 30 and 60 degrees, is also envisaged.

According to an embodiment of the method, the electronic device is a mobile phone. Nowadays a mobile phone is usually equipped with a camera and an amount of storage suitable for storing reference data and the application program. An app, i.e. an application program, may be resident in the storage of the mobile phone for performing the calculations according to the present invention.

According to another embodiment, the mobile phone is connectable via a network to a server at which the reference data and the application program resides.

According to another embodiment, part of the application program resides on the mobile phone and part of application program resides on the server. The mobile phone is compact and may be used to take the picture according to the method of the present invention.

According to an embodiment of the method, the electronic device is an image reproduction apparatus comprising a recording material unit suitable for comprising the camera, the recording material and the core of the roll, and a control unit for comprising storage for the application program and the reference data.

According to an embodiment of the method, the electronic device is an image reproduction apparatus comprising a recording material unit suitable for comprising the camera, the recording material and the core of the roll, and a control unit for controlling a connection to a server for storage of the application program and the reference data.

The present invention also relates to an electronic device comprising a user interface screen, a camera and a storage device configured to store reference data about a roll and a recording material, and the application program for implementing the method according to the present invention, said electronic device is configured to invoke the application program via the user interface screen and to display the calculated amount of the unconsumed part of the recording material at the user interface screen.

The present invention also relates to an electronic device comprising a user interface screen and a camera, wherein the user interface screen and the camera are connectable to a server on which reference data about a roll and the recording material in an unconsumed state are stored, wherein the application program for implementing the method according to the present invention is stored, and wherein said electronic device is configured to invoke the application program via the user interface screen and to display the calculated amount of the unconsumed part of the recording material at the user interface screen.

The present invention also relates to an image reproduction apparatus comprising a user interface screen, a recording material unit suitable for comprising a camera and a roll of recording material, an engine unit for consuming the roll of recording material, and a control unit for comprising a storage device for storing reference data about the roll of recording material in an unconsumed state and for storing the application program for implementing the method according to the present invention, wherein said image reproduction apparatus is configured to invoke the application program via a user action by means of the user interface screen and to display the calculated amount of the roll at the user interface screen.

The present invention also relates to an image reproduction apparatus comprising a user interface screen, a recording material unit suitable for comprising a camera and a roll of recording material, an engine unit for consuming the roll of recording material, and a control unit for controlling a connection to a server for storing reference data about the roll of recording material in an unconsumed state and for storing the application program for implementing the method according to the present invention, said image reproduction apparatus configured to invoke the application program via a user action by means of the user interface screen and to display the calculated amount of the roll at the user interface screen.

The present invention also relates to a computer program product embodied on a non-transitory computer readable medium that, when executed on a processor, performs a method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numerals throughout the several views.

Figure 1:
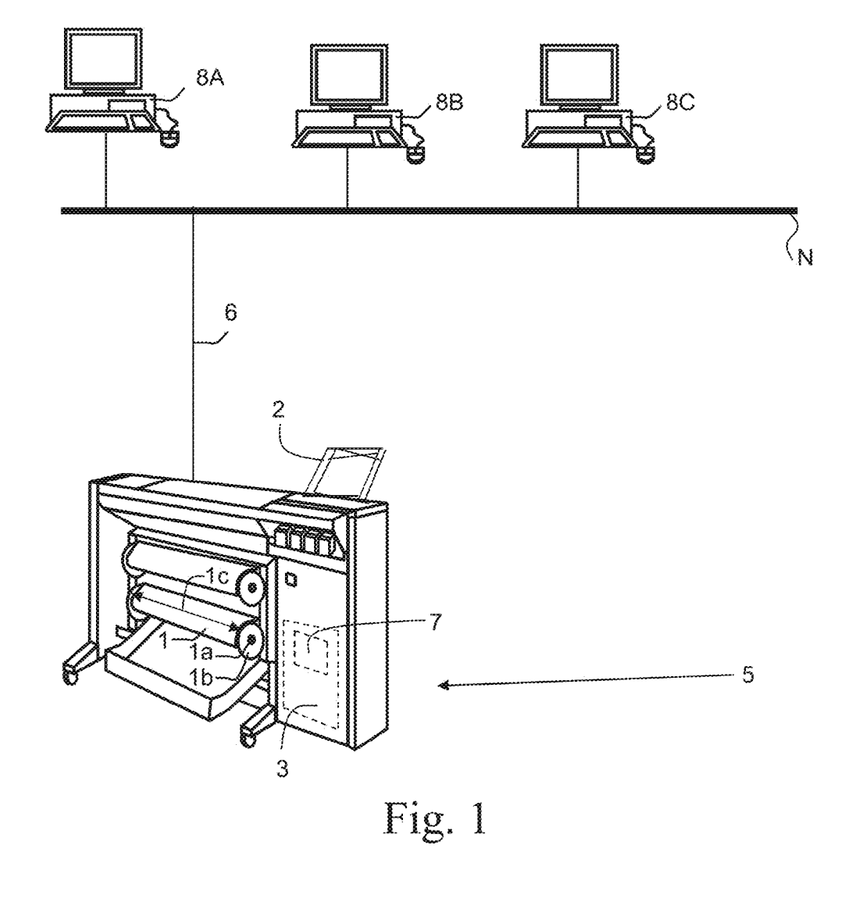
FIG. 1 is a schematic view of an image reproduction apparatus comprising a roll of media.

FIG. 1 shows a reproduction system comprising workstations 8A-8C connected to a network N. A reproduction apparatus 5 is available for a user working with one of the workstations 8A-8C and intending to send a print job comprising a set of documents from one of the workstations 8A-8C to the reproduction apparatus 5. The reproduction apparatus 5 is connected to the network N and suited for receiving print jobs from the workstations 8A-8C. The network N may be wireless. The reproduction apparatus 5 comprises a local user interface unit 2 suitable for displaying print jobs, selecting a print job and editing settings of a print job. A control unit 3 is suited to store a queue of print jobs, to check whether or not the queue is empty and to submit a document from a queued print job to the print engine of the reproduction apparatus 5 in order to be printed. Documents of a print job are stored in a storing device 7 contained in the control unit 3 at least for the time period that the document is printed by the print engine and finished by a finisher.

The reproduction apparatus 5 works up a roll 1 of media having a width indicated by an arrow 1c and a length. The length of the media on the roll is defined as a dimension of the media perpendicular to the width of the media in the plane of the media when completely unrolled. Media material may be paper, textile, metal plates, printed circuit plates, solar cell plates, overhead sheet material, plastic or any other kind of suitable receiving material or substrate. The roll 1 has been put in a holder. An end grain of the roll 1 comprises a part 1a of the core of the roll 1 and a side part 1b of the media of the roll 1. In FIG. 1, the core of the roll 1 and the side part of the media on the roll 1 are visible, but image reproduction apparatuses exist that have a housing that shields the roll such that the core of the roll and the media on the roll are not visible from the outside of the reproduction apparatus 5.

Figure 2:
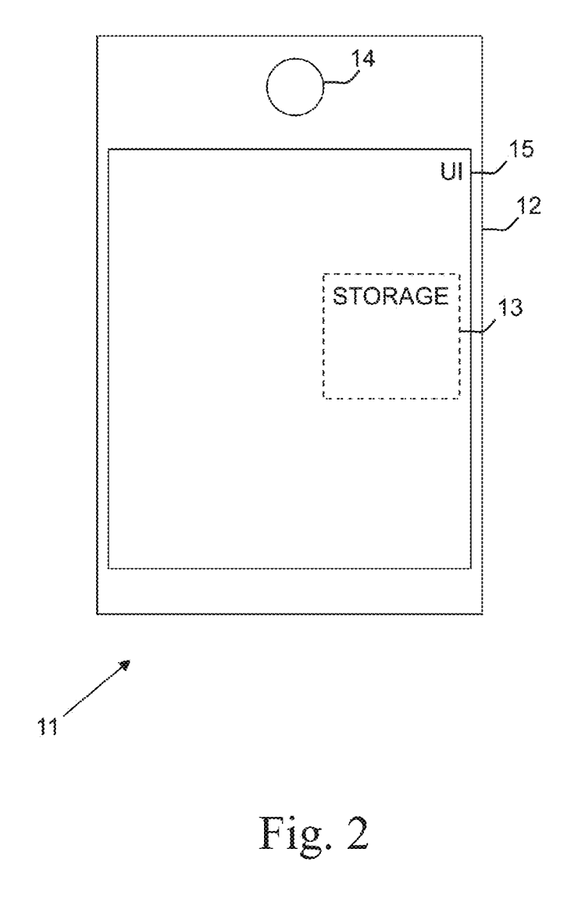
FIG. 2 is a schematic view of an electronic device according to the present invention.

FIG. 2 is a schematic view of an electronic device 11 according to the present invention. The electronic device 11 comprises a user interface screen 15 for displaying user interactive dialogs and for requesting data to be input by a user, a storage unit 13 for storing pictures, applications, etc., and a camera 14 for taking pictures of objects in front of the eye of the camera 14. The storage unit 13 may comprise the reference data according to the present invention. When an application program according to the present invention is started, a picture is asked to be taken by means of the camera 14 from an end grain of a roll to be investigated. The picture is stored in the storage unit 13 for further pixel counting and calculations. The user interface screen 15 is used to display the result of the method according to the present invention, i.e. the at least one characteristic of the roll comprising the remaining media.

In another embodiment, the electronic device 11 is connected via a network to a server. The reference data and/or the application program resides on the server. According to this embodiment, the picture is transmitted to the server for further pixel counting and calculations and the results of the calculations are transmitted to the electronic device 11.

Figure 3:
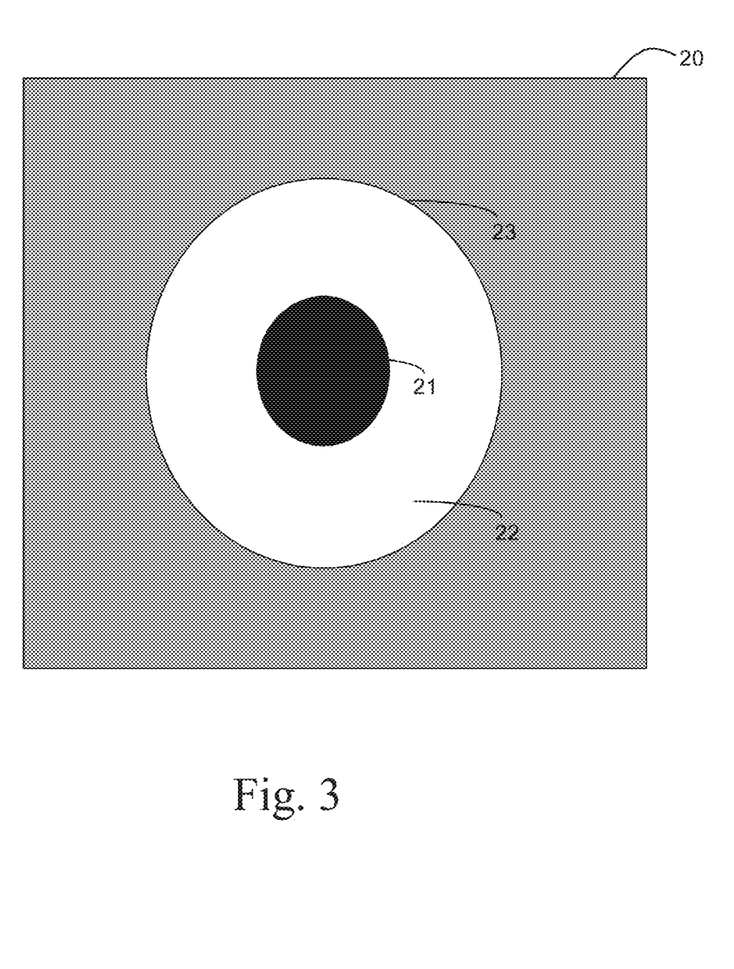
FIG. 3 is a schematic view of a picture taken of an end grain of the roll.

FIG. 3 is a schematic view of a picture 20 taken of an end grain of the roll 1 at a background represented by a grey color. (Roll 1 has been removed from the image reproduction apparatus 5 or has been taken from a stock of rolls). The picture is taken in front of the end grain of the roll, so that no part of the roll that is behind the end grain is visible in the picture 20. A core of the roll is represented by a black filled-up ellipse 21. Media on the roll are represented by a white area 22 between the black filled-up ellipse 21 and another larger ellipse 23.

A picture like FIG. 3 may be taken by the camera 14 of the electronic device 11 for an unused roll and stored in the storage unit 13 of the electronic device 11 as a second picture. The picture in FIG. 3 is taken by the camera 14 of the electronic device 11 for a used roll and stored in the storage unit 13 of the electronic device 11.

An application stored in the storage unit 13 is able to count the pixels of the picture 20 which represent the core of the roll, i.e. the pixels within and on the black filled-up ellipse 21 resulting in a first number $N_1$ of pixels. The application is also able to count the pixels of the picture 20 which represent the remaining media on the roll, i.e. the pixels of the picture 20 which have a white color within the larger ellipse 23, resulting in a second number $N_2$ of pixels. The pixels of the grey background are not counted.

Such counting of a first number and a second number is also established for the second picture of an unused roll—in the storage unit 13 or at an external server—resulting in a first reference number $N_{1ref}$ and a second reference number $N_{2ref}$. The second picture may be taken from another angle and/or from another distance. The storage unit 13 also has stored a number $L_{ref}$ of the length of an unused roll of the same kind as roll 1. The goal of the present invention is to estimate a length L of the remaining media on the roll 1.

The following formula (1) reveals the calculation of the wanted length L:

$$L = L_{ref} * (N_2/N_1)/(N_{2ref}/N_{1ref}) \quad (1)$$

For convenience reasons, the picture 20 has been taken just in front of the end grain of the roll 1, but may be taken from any angle as long as the end grain is still visible for the camera's eye. The concentric ellipses 21, 23 will become elongated or broadened. At each angle shot at each distance, the eccentricity of the smaller ellipse 21 will be the same as the eccentricity of the larger ellipse 23. Therefore the elongation or broadening of the ellipses 21, 23 does not effect the truth of the formula (1) here-above. It is noted that a change in distance from the camera to the end grain also does not effect the truth of formula (1)

The term $N_{2ref}/N_{1ref}$ may be stored as a quotient $Q_{ref}$ in the reference data. The quotient $Q_{ref}$ and the term $N_2/N_1$ are invariant qua shot angle with the end grain and qua shot distance to the end grain.

Figure 4:
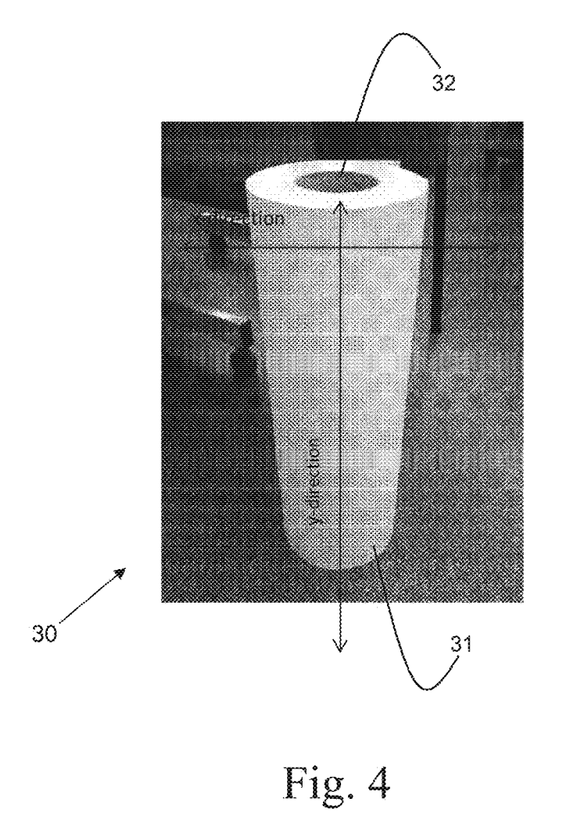
FIG. 4 is a picture taken from an end grain of the roll and the width of the roll.

FIG. 4 shows a picture 30 taken of the end grain of the roll and the width of the roll, wherein the picture of the end grain of the roll is taken from a position outside a virtual roll being an extension of the real roll. A picture of the entire roll is taken. First, the remaining media length on the roll is calculated. Then, the width of the roll is calculated.

It is noted that the calculation of the remaining media length described here-below differs from the calculation of the remaining media length corresponding to FIG. 3, in that the picture according to FIG. 3 is taken from directly above the roll standing on end. The calculation described here-below is done from a picture taken at an angle (around 45°) to the horizontal plane in order to make the calculation of the roll width with the same picture.

It is assumed that the picture is taken in a way so the roll axis is more or less in the widest direction of the picture frame (in order to maximize the roll image on the picture) called "y-direction" or "ordinate axis". The axis orthogonal to "y-direction" is called the "x-direction" or "abscissa axis". It is also assumed that a reference calibration of the Q ratio of a full roll ($Q_{ref}$ as introduced before) has been done as described with regard to FIG. 3. In the shot conditions of the picture, the perspective effect (due to the camera focal length) in the roll core plan is neglected. The picture is binarized to transform all the paper pixels 31 as white pixels, and the roll core 32 and background pixels as black pixels.

Figure 5:
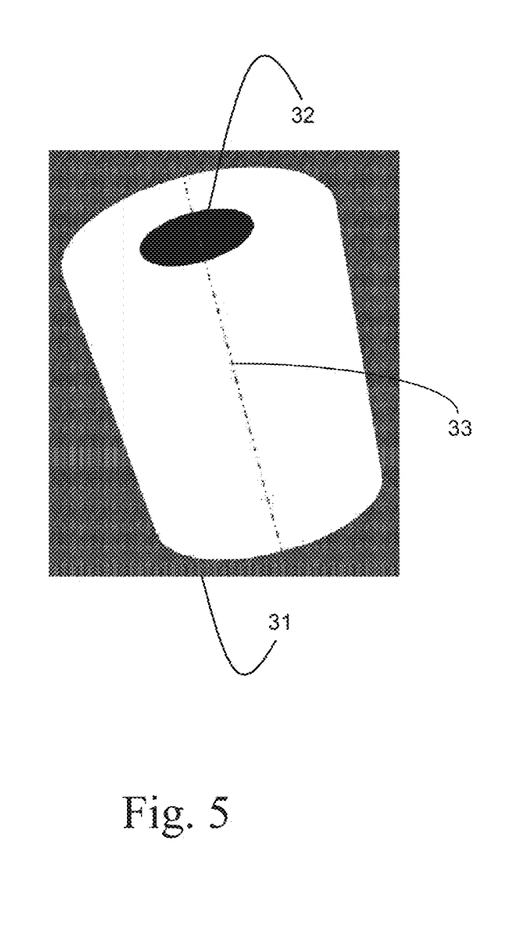
FIGS. 5-8 are schematic views of a picture taken of the end grain of the roll and a representation of the width of the roll.

A computation of the remaining length on the core is now elucidated on behalf of FIG. 5. Assuming that in the picture the apparent roll width (along the y-direction) is larger than the apparent diameter of the roll (in the x-direction), a roll axis 33 can be found by calculating a linear regression on the position of the white pixels from the binarized bitmap. The Cartesian equation of the axis 33 is: b=y−ax.

The 'a' and 'b' coefficients are estimated in the following way. The white pixels coordinates are named $(x_w, y_w)$. We define the usual averages, centered variances and covariance on these coordinates:

$$\overline{x_w} = \frac{\sum x_w}{n}; \quad \overline{y_w} = \frac{\sum y_w}{n};$$

$$\overline{x_w^2} = \frac{\sum (x_w - \overline{x_w})^2}{n}; \quad \overline{y_w^2} = \frac{\sum (y_w - \overline{y_w})^2}{n};$$

$$\overline{xy_w} = \frac{\sum (x_w - \overline{x_w}) \cdot (y_w - \overline{y_w})}{n};$$

$$\sigma_{x_w}^2 = \overline{x_w^2} - \overline{x_w}^2; \quad \sigma_{y_w}^2 = \overline{y_w^2} - \overline{y_w}^2; \quad \sigma_{xy_w} = \overline{xy_w} - \overline{x_w} \cdot \overline{y_w};$$

The chosen estimator for the 'a' coefficient of this axis is:

$$\tilde{a}_w = \frac{\sigma_{y_w}^2 - \sigma_{x_w}^2 + \sqrt{(\sigma_{y_w}^2 - \sigma_{x_w}^2)^2 + 4 \cdot \sigma_{xy_w}^2}}{2 \cdot \sigma_{xy_w}}$$

The estimator of 'b' is then:

$$\tilde{b}_w = \overline{y_w} - \tilde{a}_w \cdot \overline{x_w}$$

Figure 6:
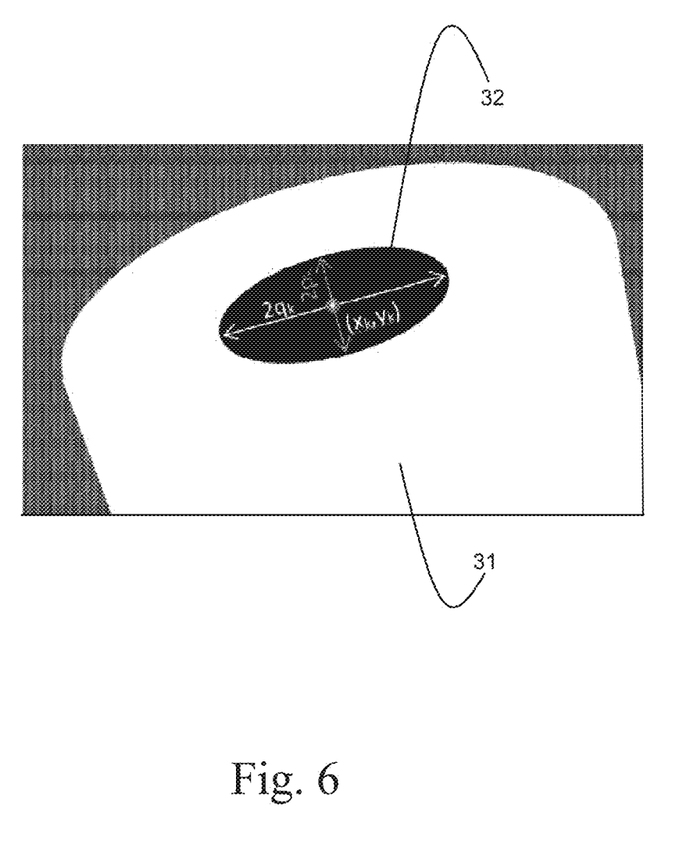

After the binarization, the roll core appears as a black ellipse 32 included totally inside the white pixels 31 on the processed picture as shown in FIG. 6. The ellipsis parameters are determined: center coordinates $(x_k, y_k)$, a semi-major axis $q_k$ and a semi-minor axis $p_k$.

The black pixels coordinates are named $(x_k, y_k)$ and, similar to the white pixels, the averages, centered variances and covariance are calculated:

$$\overline{x_k}; \overline{y_k}; \sigma_{x_b}^2; \sigma_{y_b}^2; \sigma_{xy_b};$$

The estimators for $x_k, y_k, p_k$ and $q_k$ are:

$$\tilde{x}_k = \overline{x_k}; \quad \tilde{y}_k = \overline{y_k};$$

$$\tilde{q}_k = \sqrt{2 \cdot \left(\sigma_{x_k}^2 \left| \sigma_{y_k}^2 \right| \sqrt{4 \cdot \sigma_{xy_k}^2 \left| (\sigma_{x_k}^2 \ \sigma_{y_k}^2)^2 \right|}\right)};$$

$$\tilde{p}_k = \sqrt{2 \cdot \left(\sigma_{x_k}^2 + \sigma_{y_k}^2 - \sqrt{4 \cdot \sigma_{xy_k}^2 + (\sigma_{x_k}^2 - \sigma_{y_k}^2)^2}\right)};$$

The picture is taken in a way that $q_k$ is following the x axis. In any case, we can determine if it is really the case by testing $\tilde{q}_k > \tilde{p}_k$.

Like the white pixels, the semi-major axis equation of the core ellipse is evaluated from:

$$\tilde{a}_k = \frac{\sigma_{y_k}^2 - \sigma_{x_k}^2 + \sqrt{(\sigma_{y_k}^2 - \sigma_{x_k}^2)^2 + 4 \cdot \sigma_{xy_k}^2}}{2 \cdot \sigma_{xy_k}}$$

$$\tilde{b}_k = \overline{y_k} - \tilde{a}_k \cdot \overline{x_k}$$

Figure 7:
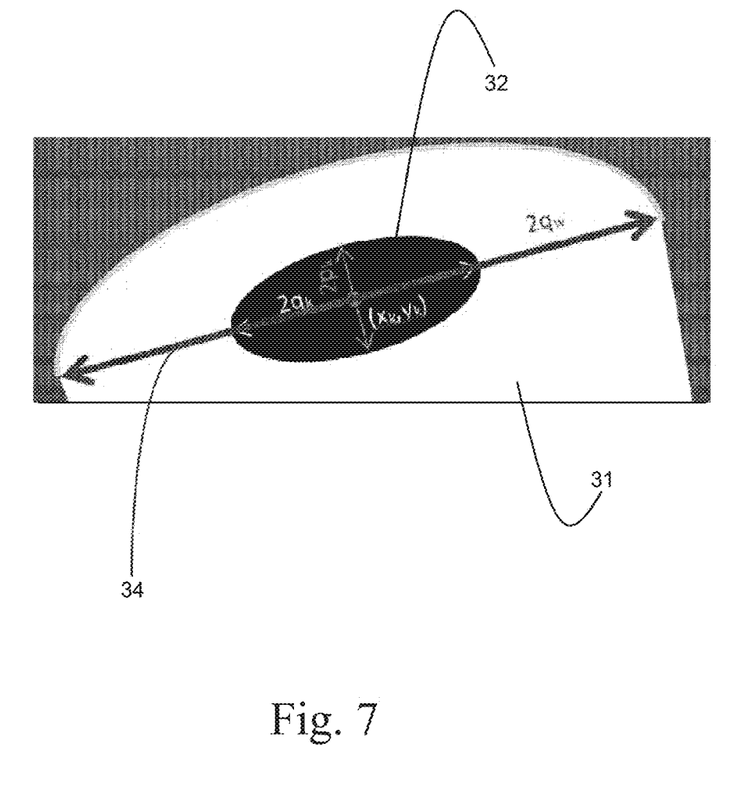

As shown in FIG. 7, by construction, the ellipse 32 of the roll core (in black) and the ellipse of the roll paper seen from aside (in white) have a common center and common semi-axis lines 34.

We compute the projected length $2\tilde{q}_w$ of the remaining paper semi-axis 34 (in dark color on FIG. 7) by searching the minimal and maximal abscissas $x_{w_{min}}$ and $x_{w_{max}}$ of the white pixels on the semi-axis equation:

$$\tilde{b}_k = y - \tilde{a}_k x$$

$$2\tilde{q}_w = (x_{w_{max}} x_{w_{min}}) \cdot \sqrt{1 | \tilde{a}_k^2}$$

The area ratio $Q_m$ of the paper ellipse area by the core ellipse area is then:

$$Q_m = \frac{\tilde{q}_w^z}{\tilde{q}_k^2}$$

An estimation of the remaining length can be deduced as described with regard to FIG. 3.

Secondly, the roll width is computed. Since it is assumed that the core is physically a circle, the estimated angle θ between the camera optical axis and the roll core plan is evaluated with:

$$\tilde{\theta} = \sin^{-1}\left(\frac{\tilde{p}_k}{\tilde{q}_k}\right)$$

It is also assumed that the user provides by the application program the physical diameter of the core $\Phi_c$. Therefore, the $\tilde{p}_k$ estimator can be used to calibrate the scale factor $f_c$ and to measure the lengths on the semi-minor axis of the core:

$$f_c = \frac{\Phi_c}{2\tilde{p}_k}$$

Minimal and maximal ordinates $y_{w_{min}}$ and $y_{w_{max}}$ are determined of the white pixels on the roll axis equation:

$$\tilde{b}_w = \overline{y_w} - \tilde{a}_w \cdot \overline{x_w}.$$

Figure 8:
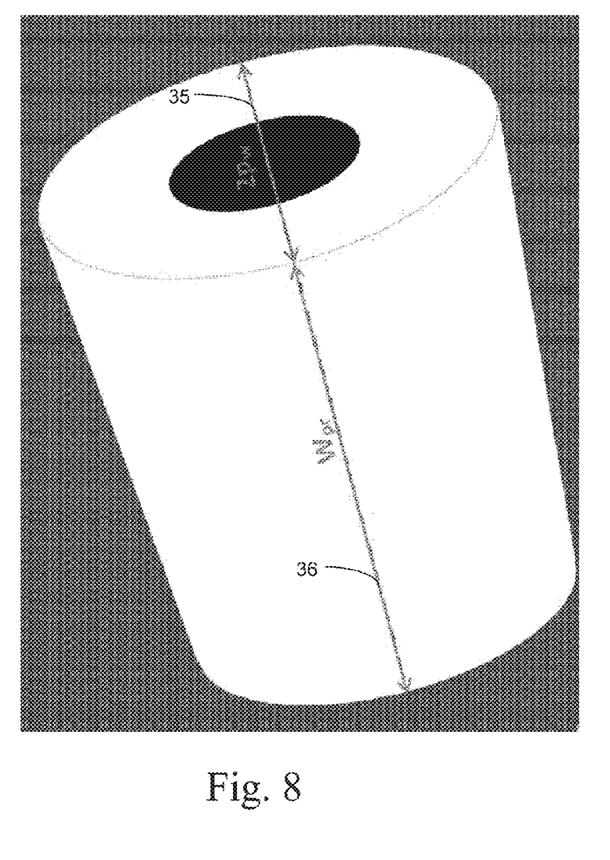

The semi-minor axis 35 of the white ellipse according to FIG. 8 is deduced from its semi-major axis and the black ellipse eccentricity:

$$\tilde{p}_{kw} = \tilde{q}_w \cdot \frac{\tilde{p}_k}{\tilde{q}_k}$$

The projected width $W_{pr}$ of the roll 36 is then given by:

$$W_{pr} = \frac{(y_{w\max} - y_{w\min}) \cdot \sqrt{1+\tilde{a}_w^2}}{\tilde{a}_w} - 2 \cdot \frac{\tilde{p}_k \cdot \tilde{q}_w}{\tilde{q}_k}$$

In this evaluation, the perspective effect is neglected and an evaluator $\tilde{W}_r$ of the physical roll width is:

$$\tilde{W}_r = f_c \times \frac{W_{pr}}{\cos\tilde{\theta}}.$$

A similar method may be used to estimate a remaining fluidum in a non-translucent recipient by means of an electronic device having a camera and storage means comprising reference data about an empty recipient. The reference data may also be stored on a server that has a connection to the electronic device via a network. At the server, the reference data and/or the application program resides.

The recipient has an opening at a top side of the recipient. The area of the opening is wider than or equal to the area of a bottom of the recipient. The reference data comprises the dimensions of the recipient and the method comprises the steps of taking a picture of the maximal opening at the top side of the recipient by means of the camera, deriving from the picture a first number of pixels representing a visible part of the recipient, deriving from the picture a second number of pixels representing the visible part of the fluidum in the recipient, and estimating the volume of the remaining fluidum in the recipient based on the reference data, the first number and the second number, wherein the reference data comprises at least the volume of the fluidum when the recipient is fully filled. The volume of the fluidum when the recipient is fully filled is equal to the volume of the recipient.

By doing so, the volume is estimated by taking a photo with the camera of the electronic device and performing calculations with an application installed on the electronic device or on an external server connected to the electronic device. When a picture of the opening at the top side of the recipient is taken, the picture will show the recipient, the fluidum in the recipient and a background. The fluidum forms an inner part of the picture, while the recipient forms an outer part of the picture circumventing the inner part of the picture representing the fluidum. Usually, the fluidum and the recipient are easily distinguishable from each other. If this is not the case, a recipient may be selected having a deviating color than the color of the fluidum. Usually, the recipient and the background are also easily distinguishable. If this is not the case, a background may be selected having a deviating color than the color of the recipient. A vertical axis of the recipient is to be deduced from the picture. From this vertical axis, a first part corresponds to a distance from the top of the recipient to the fluidum and a second part corresponds to a distance from the bottom of the recipient to the top of the recipient. Knowing this, a simple formula for the remaining volume of the fluidum may be derived from these distances, and a volume of the recipient that is contained in the reference data.

If in a calibration phase more than one recipient is measured, the reference data will comprise identification data for each kind of recipient having a wide opening at the top side of the recipient. The identification data are requested to be entered and added to the reference data during the calibration phase. The identification may be performed by scanning an identification code on the recipient. The recipient from which the first picture is taken may also be identified by entering identification data before the calculation of the remaining fluidum is performed. The entered identification data will be compared with the identification data already present in the reference data. According to a further embodiment, the amount of the fluidum in the recipient is expressed as a number of volume units of the fluidum in the recipient.

Such a method comprises the steps of taking a picture from above the recipient with the camera, deriving from the picture a first number of pixels representing a fluidum in the recipient, deriving from the picture a second number of pixels representing the shape of the recipient, and estimating the remaining amount of fluidum in the recipient based on the reference data, the first number and the second number. The reference data may comprise the dimensions of the empty recipient and/or data derived from a picture of the empty recipient.

Figure 9:
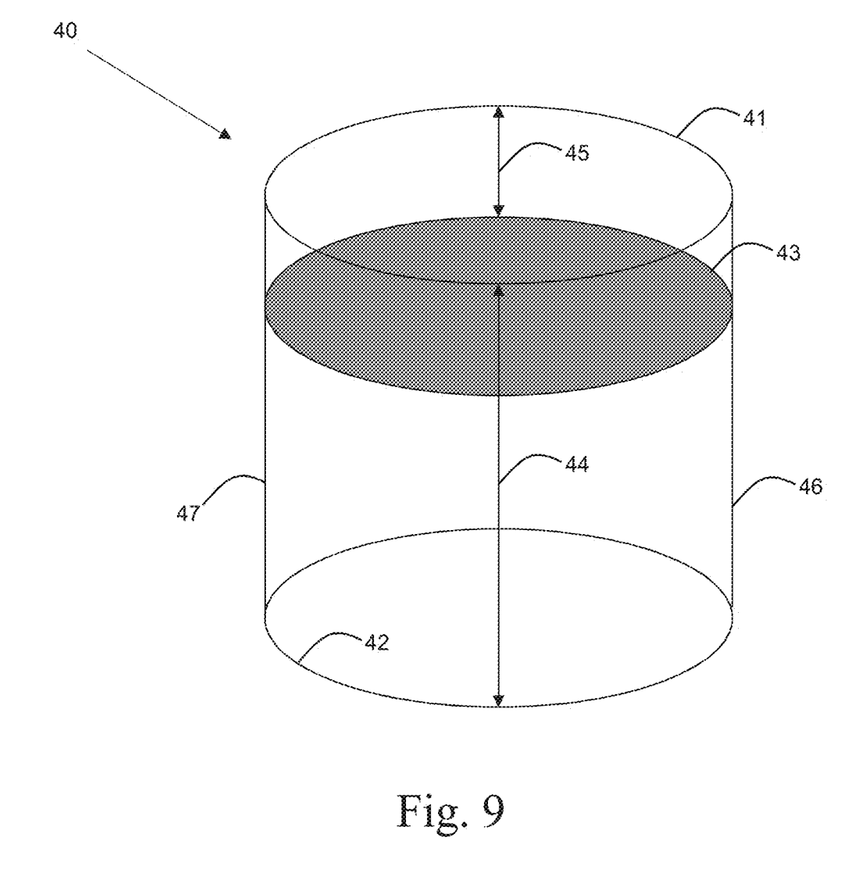
FIG. 9 is a schematic view of a picture taken of a top side of a recipient filled with a remaining amount of fluidum.

For example, the volume of coffee in a cup or the amount of paint remaining in a bucket may be estimated by taking a picture from above as shown in FIG. 9, comparing with reference data present at the smart phone or at a server connected to the smart phone and deriving the remaining amount from the reference data and the recognition of the shape 40 of the recipient and an amount of the fluidum in the recipient 40 from the picture.

The reference data contains the dimensions of the recipient object 40, i.e. a total volumn $V_{total}$ of the recipient is known. An image processing algorithm suitable for recognizing the shape of the recipient 40 and an amount of fluidum in the recipient is used to detect a level 43 of remaining fluidum in the recipient and the recipient shape. The recipient dimensions can be different due to the angle of the camera when taking the picture, but the deformations are isomorphic. Therefore, it is possible to estimate the remaining fluidum in the recipient from the liquid level.

FIG. 9 shows a 3-dimensional container as a recipient and 2-dimensional shape on a top 41 of the recipient and a bottom 42 of the recipient. For convenience reasons, the top 41 and the bottom 42 are parallel, e.g. a bucket of paint. The total volume $V_{total}$ of the recipient 40 is known. The fluidum to be measured can be differentiated from the inside of the recipient 40. The diameter of the recipient is small enough to make negligible the difference of the apparent heights of the front side and the rear side. The recipient 40 is not translucent. However, for convenience reasons FIG. 9 shows all line curves necessary to explain the estimation of the remaining fluidum.

The linear regression for detecting the vertical axis 33 in FIG. 5 explained in the previous embodiment is applied to detect the vertical axis of the recipient 40. From the vertical axis we can count the number of pixels of the height 44 of the front of the recipient (H) and we can count the number of pixels from the rear top edge to the inside-level of the contents (h) on line segment 45.

The remaining volume of the fluidum is computed to be equal to:

$$V_{remaining}=h/H*V_{total}.$$

In FIG. 9 the vertical sides 46, 47 are assumed to be parallel, but a recipient having a top opening that is wider than the bottom of the recipient may be envisaged. The formula of $V_{remaining}$ mentioned here-above is easily to be adapted to be suitable for such a recipient. For such a recipient the area size of the top opening and the area size of the bottom (determining an angle between two sides similar to the vertical sides 46, 47) may be part of the reference data and may be used in the calculations. If the diameter of the top opening equals X and the diameter of the bottom equals x, then the volume of the complete filled recipient is $1/12*\pi*(X^3-x^3)$. If the same heights H and h are deducted from the picture, we get the following approximating formula for the remaining fluidum:

$$V_{remaining}=1/12*\pi*((X-(X-x)*(h/H))^3-x^3).$$

It may be clear to the skilled person that the various embodiments of the method, the electronic devices and the image reproduction apparatuses may be combined in one way or another in order to establish an appropriate and applicable embodiment of the method according to the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of estimating a volume of a remaining fluidum in a non-translucent recipient having an opening at a top side of the recipient which area of the opening is wider than or equal to the area of a bottom of the recipient, the method being implemented as an application program for an electronic device having a camera, said method comprising the steps of:
    taking a picture of the opening at the top side of the recipient by means of the camera;
    the electronic device:
    deriving from the picture characteristics of a first number of pixels representing a visible part of the recipient;
    deriving from the picture characteristics of a second number of pixels representing a visible part of the fluidum in the recipient;
    requesting from a user an identification of the recipient;
    receiving from the user the identification of the recipient;
    matching the received identification with a stored identification in order to retrieve reference data about an empty recipient; and
    estimating a volume of the remaining fluidum in the recipient by means of the retrieved reference data and a ratio of the characteristics of the first number of pixels and the characteristics of the second number of pixels, wherein
    the picture is taken from a first arbitrary angle to the recipient and from a first arbitrary distance to the recipient as long as the remaining fluidum and the recipient are visible for the camera, wherein
    a picture for creating the reference data is taken from a second arbitrary angle to the recipient and from a second arbitrary distance to the recipient as long as the remaining fluidum and the recipient are visible for the camera, and
    wherein the second arbitrary angle and the second arbitrary distance are independent from the first arbitrary angle and from the first arbitrary distance respectively.

2. The method according to claim 1, wherein the reference data comprises at least the volume of the fluidum when the recipient is fully filled.

3. The method according to claim 2, wherein the electronic device has a user interface screen and said method further comprises the step of displaying the estimated volume of the remaining fluidum on the user interface screen.

4. The method according to claim 3, wherein the estimated volume is expressed in volume units of the fluidum.

5. The method according to claim 1, wherein the electronic device comprises a storage device configured to store the reference data and the application program.

6. The method according to claim 1, wherein the electronic device is connectable to a server via a network, the reference data and the application program being stored on the server, said method further comprising the steps of transmitting the picture to the server and transmitting the estimated volume from the server to the electronic device.

7. An electronic device comprising:
    a user interface screen;
    a camera;
    a storage device configured to store reference data about an empty recipient; and
    the application program for implementing the method according to claim 1,
    wherein said electronic device is configured to invoke the application program via the user interface screen and to display the estimated volume of remaining fluidum in the recipient at the user interface screen.

8. The electronic device according to claim 7, wherein the electronic device is a mobile apparatus.

9. The electronic device according to claim 8, wherein the mobile apparatus is a mobile phone.

10. An electronic device comprising:
a user interface screen;
a camera;
wherein the user interface screen and the camera are connectable to a server on which reference data about an empty recipient are stored,
wherein the application program for implementing the method according to claim 1 is stored on the server, and
wherein said electronic device is configured to invoke the application program via the user interface screen and to display the estimated volume of remaining fluidum in the recipient at the user interface screen.

11. The electronic device according to claim 10, wherein the electronic device is a mobile apparatus.

12. The electronic device according to claim 11, wherein the mobile apparatus is a mobile phone.

13. A computer program product embodied on a non-transitory computer readable medium that, when executed on a processor, performs the method according to claim 1.

\* \* \* \* \*